(12) United States Patent
Yang et al.

(10) Patent No.: US 11,209,574 B2
(45) Date of Patent: Dec. 28, 2021

(54) METHOD FOR FORECASTING AN AGRICULTURAL IRRIGATION WATER REQUIREMENT

(71) Applicant: China Institute of Water Resources and Hydropower Research, Beijing (CN)

(72) Inventors: Guiyu Yang, Beijing (CN); Hao Wang, Beijing (CN); Juncang Tian, Beijing (CN); Wanli Shi, Beijing (CN); Lin Wang, Beijing (CN); Zhaohui Yang, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 17/259,564

(22) PCT Filed: Jun. 10, 2020

(86) PCT No.: PCT/CN2020/095484
§ 371 (c)(1),
(2) Date: Jan. 21, 2021

(87) PCT Pub. No.: WO2021/068540
PCT Pub. Date: Apr. 15, 2021

(65) Prior Publication Data
US 2021/0247544 A1    Aug. 12, 2021

(30) Foreign Application Priority Data
Oct. 12, 2019    (CN) .......................... 201910968814.7

(51) Int. Cl.
*G01W 1/10* (2006.01)
*G01W 1/14* (2006.01)
(Continued)

(52) U.S. Cl.
CPC ................ *G01W 1/10* (2013.01); *G01W 1/14* (2013.01); *G06Q 10/04* (2013.01); *G06Q 50/02* (2013.01); *A01G 25/00* (2013.01)

(58) Field of Classification Search
CPC .......... G01W 1/10; G01W 1/14; A01G 25/00
(Continued)

(56) References Cited

U.S. PATENT DOCUMENTS 11,022,719 B2 * 6/2021 Lemos .................... G06F 17/16
2008/0091307 A1 * 4/2008 Dansereau ........... A01G 25/167
700/284

(Continued)

FOREIGN PATENT DOCUMENTS

CN    106570627 A    4/2017
CN    107301481 A    10/2017
(Continued)

*Primary Examiner* — Ricky Go
(74) *Attorney, Agent, or Firm* — Bayramoglu Law Offices LLC

(57) ABSTRACT

A method for forecasting an agricultural irrigation water requirement includes: selecting a baseline period and crops each with a sown area larger than a set proportion as typical crops; calculating an irrigation water quota of the typical crop during a growth stage according to meteorological information; obtaining ten-day rainfall in a water-saving area from weather stations; and calculating effective rainfall in a sown region of the typical crop based on the ten-day rainfall; calculating an irrigation water requirement per unit area of the typical crop; and determining whether the irrigation water requirement per unit area of at least one typical crop is greater than an average of actual irrigation water usage per unit area measured in consecutive years, if yes, correcting the irrigation water requirement per unit area (Continued)

of all typical crops according to actual irrigation water usage; otherwise calculating a total water requirement for a next year.

7 Claims, 1 Drawing Sheet

(51) Int. Cl.
*G06Q 10/04* (2012.01)
*G06Q 50/02* (2012.01)
*A01G 25/00* (2006.01)

(58) Field of Classification Search
USPC .................................................. 702/3
See application file for complete search history.

(56) References Cited

U.S. PATENT DOCUMENTS

| | | | |
|---|---|---|---|
| 2011/0137827 A1* | 6/2011 | Mason, Sr. | G06Q 10/06 705/413 |
| 2014/0236868 A1* | 8/2014 | Cook | G06Q 50/02 705/412 |
| 2019/0156437 A1* | 5/2019 | Dail | G06Q 50/02 |

FOREIGN PATENT DOCUMENTS

| | | |
|---|---|---|
| CN | 107491844 A | 12/2017 |
| CN | 107950324 A | 4/2018 |
| CN | 108280773 A | 7/2018 |
| CN | 109447426 A | 3/2019 |
| CN | 109657854 A | 4/2019 |
| CN | 110580657 A | 12/2019 |
| WO | 2018081853 A1 | 5/2018 |

* cited by examiner

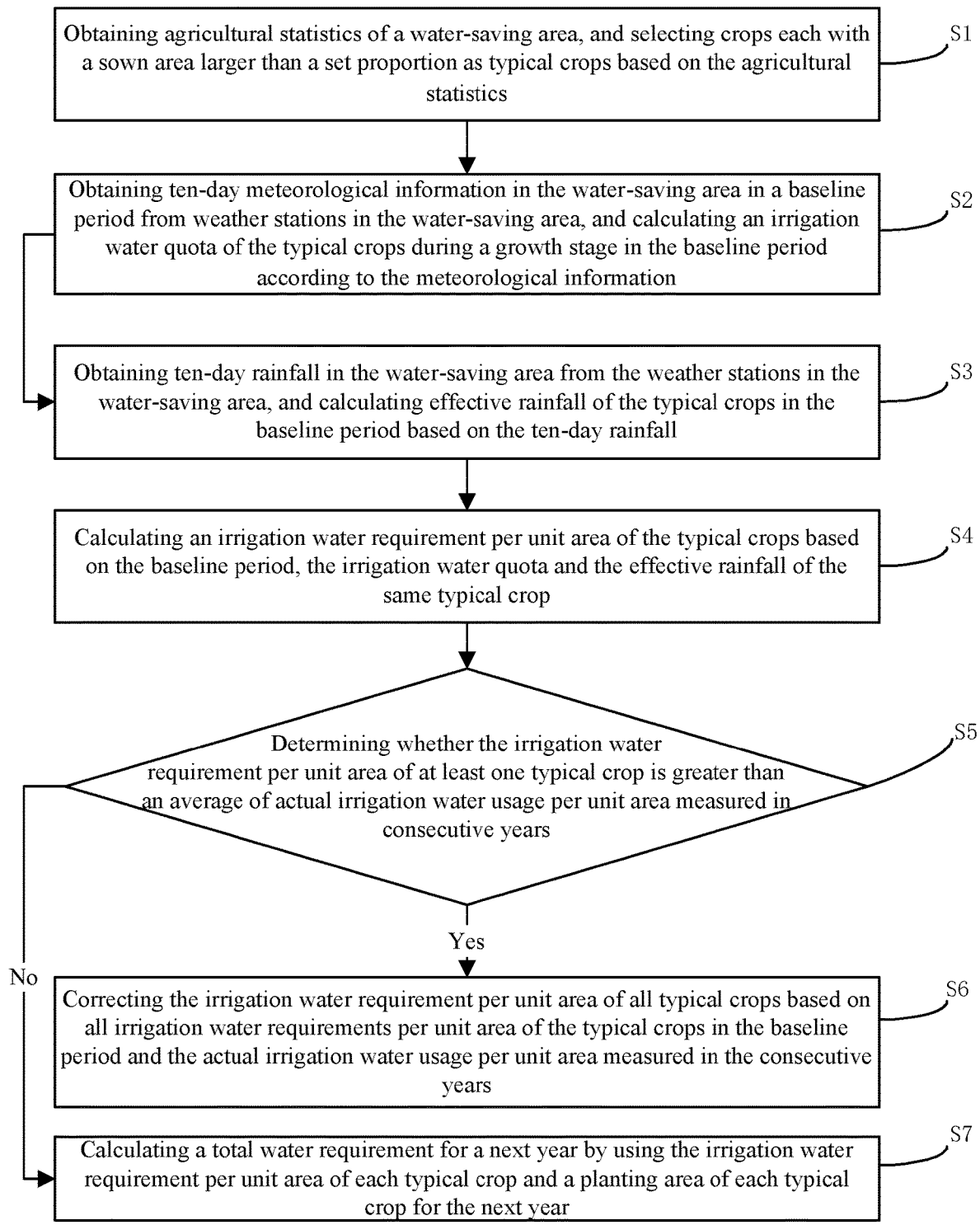

METHOD FOR FORECASTING AN AGRICULTURAL IRRIGATION WATER REQUIREMENT

CROSS REFERENCE TO THE RELATED APPLICATIONS

This application is the national phase entry of International Application No. PCT/CN2020/095484, filed on Jun. 10, 2020, which is based upon and claims priority to Chinese Patent Application No. 201910968814.7, filed on Oct. 12, 2019, the entire contents of which are incorporated herein by reference.

TECHNICAL FIELD

The present invention relates to agricultural irrigation technology, and more particularly, to a method for forecasting an agricultural irrigation water requirement.

BACKGROUND

Implementing a water saving precedence policy requires controlling water use and quota management as key elements. Much water is used for agricultural activities and the issue of having an effective and logical method for determining the amount of water required for agricultural purposes has not been addressed. This is because the amount of water used in agricultural activities is not only associated with the agricultural crop types but also it is closely related to other numerous factors. Factors such as climate, water-saving technology and water-saving irrigation systems. Agricultural water requirements are typically determined by using the historical experience with crop types and the average of the irrigation quota levels under the conditions mentioned previously. Such a method to determine, is unreliable and cannot truly reflect the effectiveness of agricultural water-saving measures without the proper verification. Thus, causing a high use and increased cost of agricultural water in many regions. Furthermore, without achieving the water-saving agricultural irrigation and the lack of inefficient use of water resources, planting costs increases and ultimately reduces the agricultural output.

SUMMARY

In view of the above-mentioned shortcomings in the prior art, the present invention provides a method for forecasting an agricultural irrigation water requirement, which can accurately forecast the total water requirement for the next year.

In order to achieve the above-mentioned objective, the present invention provides the following technical solutions.

A method for forecasting an agricultural irrigation water requirement includes:

S1: obtaining agricultural statistics of a water-saving area, and selecting crops each with a sown area larger than a set proportion as typical crops based on the agricultural statistics;

S2: obtaining ten-day meteorological information in the water-saving area in a baseline period from weather stations in the water-saving area, and calculating an irrigation water quota of the typical crops during a growth stage in the baseline period according to the meteorological information;

S3: obtaining ten-day rainfall in the water-saving area from the weather stations in the water-saving area, and calculating effective rainfall in a sown region of the typical crops in the baseline period based on the ten-day rainfall;

S4: calculating an irrigation water requirement per unit area of the typical crops based on the baseline period, the irrigation water quota and the effective rainfall in the sown region of the same typical crop;

S5: determining whether the irrigation water requirement per unit area of at least one typical crop is greater than an average of actual irrigation water usage per unit area measured in consecutive years, if yes, proceeding to step S6, otherwise proceeding to step S7;

S6: correcting the irrigation water requirement per unit area of all typical crops based on all irrigation water requirements per unit area of the typical crops in the baseline period and the actual irrigation water usage per unit area measured in the consecutive years; and S7: calculating a total water requirement for the next year by using the irrigation water requirement per unit area of each typical crop and a planting area for the next year.

The advantages of the present invention are as follows. In this technical solution, the irrigation water requirement per unit area of the crop is determined based on the irrigation water quota and effective rainfall calculated through the meteorological information in the baseline period. When less than the actual irrigation water usage, the irrigation water requirement is corrected based on the actual irrigation water usage to obtain a forecasted irrigation water requirement that is infinitely close to the actual value, thereby improving the accuracy of the forecasted irrigation water requirement to ensure the accuracy of forecasting the total water requirement. The irrigation water requirement is corrected year by year to approach the actual value, which reduces the irrigation water usage and improves the efficiency of utilizing agricultural irrigation water.

Subsequently, managers of the water-saving area utilize the accurate total water requirement to maximize the planting area while meeting the water requirement planned by the Ministry of Agriculture, thereby ensuring the ultimate economic benefits of the crops.

BRIEF DESCRIPTION OF THE DRAWINGS

FIGURE is a flow chart of the method for forecasting an agricultural irrigation water requirement.

DETAILED DESCRIPTION OF THE EMBODIMENTS

Hereinafter, the specific embodiments of the present invention are described to help those skilled in the art understand the present invention. However, it should be noted that the present invention is not limited to the scope of the specific embodiments. For those of ordinary skill in the art, as long as various changes fall within the spirit and scope of the present invention defined and determined by the appended claims, these changes are obvious. All inventions and creations using the concept of the present invention shall fall within the scope of protection of the present invention.

As shown in FIGURE, a method for forecasting an agricultural irrigation water requirement includes steps S1-S7.

Step S1: agricultural statistics of a water-saving area are obtained, and crops each with a sown area larger than a set proportion are selected as typical crops based on the agricultural statistics.

In an embodiment, a crop with a proportion of larger than 10% of the total sown area of the crops in the water-saving area is determined as the typical crops, and has a sown area denoted by $A_i$, (i=1,2,3, . . . n), wherein i denotes the type of the typical crop in the water-saving area, and n denotes the total number of the typical crops.

Step S2: ten-day meteorological information in the water-saving area in a baseline period is obtained from weather stations in the water-saving area, and an irrigation water quota of the typical crop during a growth stage in the baseline period is calculated according to the meteorological information.

In an embodiment of the present invention, step S2 further includes:

S21: according to the meteorological information, ten-day potential evapotranspiration of the typical crop in the baseline period is calculated by using a Penman Monteith (PM) equation expressed as follows:

$$ET_0 = \frac{0.408\Delta(R_n - G) + \gamma \frac{900}{T+273}U_2(e_a - e_d)}{\Delta + \gamma(1 + 0.34U_2)};$$

wherein, $ET_0$ denotes the ten-day potential evapotranspiration of the typical crop in the baseline period; $\Delta$ denotes the slope of the saturation vapor pressure-temperature curve; $R_n$ denotes the net radiation at the canopy of the typical crop; G denotes the soil heat flux; $\gamma$ denotes the psychrometric constant; T denotes the mean temperature; $U_2$ denotes the wind speed at 2-meter height; $e_a$ denotes the saturation vapor pressure; $e_d$ denotes the actual vapor pressure;

S22: a ten-day water requirement of the typical crop is calculated based on the ten-day potential evapotranspiration and a ten-day crop coefficient of the same typical crop during the growth stage as follows:

$$ET_{i,j,k}=ET_{0,j} \times Kc_{i,k};$$

wherein, $ET_{i,j,k}$ denotes the ten-day water requirement of the typical crop i in the $k^{th}$ ten-day period of the growth stage in the $j^{th}$ year, in mm; $Kc_{i,k}$ denotes the ten-day crop coefficient of the typical crop i in the $k^{th}$ ten-day period of the growth stage; and S23: all ten-day water requirements during the growth stage are accumulated as the irrigation water quota $ET_{i,j}$ of the typical crop as follows:

$$ET_{i,j} = \sum_{k=1}^{n} ET_{0j} \times Kc_{i,k}.$$

Step S3: ten-day rainfall in the water-saving area is obtained from the weather stations in the water-saving area, and effective rainfall in the sown region of the typical crop is calculated based on the ten-day rainfall.

In an embodiment, the effective rainfall in the sown region of the typical crop is preferably calculated based on the ten-day rainfall and the ten-day water requirement by the following steps:

S31: according to the ten-day rainfall, the ten-day areal rainfall of the typical crop in the baseline period is calculated by a spatial interpolation method as follows:

when the terrain elevation of the water-saving area and a distance from a point used in the weather station to a calculation area center position are lower than a set elevation, the ten-day rainfall of the typical crop in the baseline period is calculated by a Thiessen polygon method; and when the terrain elevation of the water-saving area and the distance from the point used in the weather station to the calculation area center position are greater than or equal to the set elevation, the ten-day areal rainfall of the typical crop in the baseline period is calculated by an inverse distance weighting method;

S32: the ten-day rainfall $PE_{i,j,k}$ is obtained according to the ten-day areal rainfall and the ten-day water requirement of the same typical crop in the same ten-day period as follows:

$$PE_{i,j,k}=\min(P_{i,j,k},ET_{i,j,k});$$

wherein, $P_{i,k,j}$ denotes the ten-day areal rainfall of the typical crop i in the $k^{th}$ ten-day period of the growth stage in the $j^{th}$ year, in mm; and S33: all ten-day rainfall during the growth stage is accumulated as the effective rainfall $PE_{i,j}$ in the planting area of the typical crop as follows:

$$PE_{i,j} = \sum_{k=1}^{n} \min(P_{i,j,k}, ET_{i,j,k}),$$

$$(i = 1, 2, 3, \ldots n; j = 1, 2, 3, \ldots m; k = 1, 2, 3\ldots).$$

Step S4: the irrigation water requirement per unit area of the typical crop is calculated based on the baseline period, the irrigation water quota and the effective rainfall in the sown region of the same typical crop; wherein a method for calculating the irrigation water requirement $q_i$ per unit area of the typical crop i includes:

S41: the irrigation water requirement $IR_{i,j}$ per unit area of the typical crop i in the $j^{th}$ year is calculated as follows:

$$IR_{i,j}=ET_{i,j}-PE_{i,j}, (i=1,2,3, \ldots n, j=1,2,3, \ldots m); \text{ and}$$

S42: according to the irrigation water requirement $IR_{i,j}$, the irrigation water requirement $q_i$ per unit area of the typical crop i is calculated as follows:

$$q_i = \sum_{j=1}^{m} q_{ij} = \sum_{j=1}^{m} IR_{i,j}/m, (i = 1, 2, 3, \ldots n, j = 1, 2, 3, \ldots m).$$

Step S5: it is determined whether the irrigation water requirement per unit area of at least one typical crop is greater than an average of actual irrigation water usage per unit area measured in consecutive years, if yes, proceeding to step S6, otherwise proceeding to step S7.

Step S6: the irrigation water requirements per unit area of all typical crops are corrected based on the irrigation water requirements per unit area of all typical crops in the baseline period and the actual irrigation water usage per unit area measured in the consecutive years;

wherein, a calculation formula for correcting the irrigation water requirement per unit area of the typical crop is expressed as:

$$q_i = \frac{\sum_{j=1}^{m} q_{ij} + \sum_{g=1}^{k'} q_{i,g}}{m},$$

$(i = 1, 2, 3, \ldots n, j = 1, \ldots, m, g = 1, \ldots, k');$ wherein, $q_i$ denotes the irrigation water requirement per unit area of the typical crop i, in m$^3$; $q_{ij}$ denotes the irrigation water requirement per unit area of the typical crop i in the j$^{th}$ year, in m$^3$; m denotes the baseline period; $q_{i,g}$ denotes the actual irrigation water usage of the typical crop i in the g$^{th}$ year, and is directly calculated from the water usage published by government departments and the corresponding planting areas of the typical crops, in m$^3$; n denotes the total number of the typical crops; and k' denotes the consecutive year.

The duration of the baseline period is 5 years, namely the previous 5 years of the next year. For example, the next year is 2020, then the baseline period refers to 2015, 2016, 2017, 2018, and 2019. The consecutive year can select the data of the previous consecutive years adjacent to the forecast year.

Step S7: the total water requirement for the next year is calculated by using the irrigation water requirement per unit area of each typical crop and a planting area for the next year. Step S7 further includes:

S71: the theoretical water requirement of each typical crop for the next year is calculated by using the irrigation water requirement per unit area of each typical crop and the planting area for the next year as follows:

$$Q_i = q_i \times A_i, (i=1,2,3,\ldots n);$$

wherein, $Q_i$ denotes the theoretical water requirement of the typical crop i for the next year; $A_i$ denotes the planting area of the typical crop i for the next year; and S72: the theoretical water requirements of all typical crops are accumulated to obtain the total water requirement Q for the next year as follows:

$$Q = \sum_{i=1}^{n} Q_i, (i = 1, 2, 3, \ldots n).$$

In an embodiment of the present invention, the method for forecasting the agricultural irrigation water requirement further includes:

correcting the total water requirement for the next year, wherein the planned water usage (which can be determined through plans published by government departments) for the next year is obtained and compared with the total water requirement;

when the total water requirement is larger than the planned water usage for the next year, the planting area of the typical crop is adjusted according to an adjustment strategy, and returning to step S7; and when the total water requirement is less than or equal to the planned water usage for the next year, the total water requirement for the next year and the current planting areas of all typical crops are output.

The adjustment strategy includes: reducing the planting area of the typical crops with the smallest economic value according to a set threshold; or reducing the planting area of the typical crops with the largest irrigation water requirement according to the set threshold; or reducing the planting areas of all typical crops according to a preset proportion; wherein the set threshold is greater than the preset proportion.

The method provided by this technical solution will be described below with reference to the following specific examples.

In the present embodiment, the water-saving demonstration test area in Cangzhou, Hebei Province, China is taken as an example: the irrigation water requirement thereof is forecasted by using 2010-2014 as the baseline period, and 2015 as the next year.

Determination of Typical Crops

Based on "Hebei Statistical Yearbook", "Shijiazhuang Statistical Yearbook" and "Cangzhou Social and Economic Statistical Information", the agricultural planting structure and the sown area of the corresponding crops in the Cangzhou water-saving irrigation test area during the baseline period (2010-2014) are obtained as shown in Table 1, wherein others in the Table include sorghum and beans. The proportion of the sown area of each crop in the total sown area of regional crops is calculated to determine the crop with a proportion of larger than 10% of the total sown area as the typical crop. In this way, the determined typical crops mainly include winter wheat and corn.

TABLE 1

Statistics of crop planting area in Xinhua District

| | Sown area (hectares) | | | Proportion (%) of the sown area | | |
|---|---|---|---|---|---|---|
| Year | Winter wheat | Corn | Others (sorghum and beans) | Winter wheat | Corn | Others (sorghum and beans) |
| 2010 | 2688 | 1800 | | 59.89 | 40.11 | 0.00 |
| 2011 | 2096 | 1686 | | 55.42 | 44.58 | 0.00 |
| 2012 | 1503 | 1571 | 45 | 48.19 | 50.37 | 1.44 |
| 2013 | 1485 | 1414 | 47 | 50.41 | 48.00 | 1.60 |
| 2014 | 1119 | 1148 | 42 | 48.46 | 49.72 | 1.82 |

Acquisition of Meteorological Information

Since the sparseness of rainfall stations will affect the accuracy of determining the meteorological information, the Cangzhou weather station is selected through the national weather station network and the weather monitoring data in Cangzhou. Specifically, the Cangzhou weather station, the Botou weather station, and the Cang county weather station are selected because they are relatively close to Xinhua District. The daily typical information on meteorological elements, including daily data of rainfall, temperature, wind speed, humidity, and vapor pressure, of the weather station in the baseline period is collected to obtain ten-day meteorological information.

Determination of the Irrigation Water Quota for the Typical Crops During the Growth Stage in the Baseline Period The ten-day potential evapotranspiration $ET_0$ in the baseline period of the typical crop is calculated by using the PM equation according to the obtained meteorological information. Table 2 shows the ten-day potential evapotranspiration in the baseline period of Xinhua District. $ET_0$ is multiplied by the ten-day crop coefficient Kc of the typical crop to obtain the ten-day water usage of the typical crop in the baseline period.

TABLE 2

Potential evapotranspiration in Xinhua District

| Reference year | 2010 | 2011 | 2012 | 2013 | 2014 |
|---|---|---|---|---|---|
| Potential evapotranspiration (mm) | 1021.33 | 1015.73 | 1071.50 | 956.13 | 898.97 |
| First ten-day period of January | 8.04 | 6.77 | 6.67 | 7.30 | 8.33 |
| Middle ten days of January | 8.12 | 7.31 | 6.92 | 7.03 | 8.38 |
| Last ten-day period of January | 10.25 | 9.70 | 8.09 | 11.24 | 9.46 |
| First ten-day period of February | 10.80 | 10.90 | 9.84 | 8.88 | 11.32 |
| Middle ten days of February | 11.91 | 13.00 | 11.20 | 11.36 | 12.80 |
| Last ten-day period of February | 12.94 | 11.94 | 11.13 | 11.13 | 10.32 |
| First ten-day period of March | 21.24 | 17.57 | 22.59 | 16.49 | 19.16 |
| Middle ten days of March | 26.92 | 21.26 | 23.76 | 23.87 | 22.62 |
| Last ten-day period of March | 33.26 | 32.15 | 31.89 | 28.59 | 32.59 |
| First ten-day period of April | 35.38 | 34.22 | 35.87 | 35.52 | 25.85 |
| Middle ten days of April | 41.83 | 37.64 | 39.69 | 29.22 | 34.10 |
| Last ten-day period of April | 40.96 | 39.42 | 44.44 | 35.92 | 40.56 |
| First ten-day period of May | 40.30 | 45.44 | 47.19 | 44.83 | 37.94 |
| Middle ten days of May | 50.20 | 46.58 | 53.22 | 44.70 | 49.04 |
| Last ten-day period of May | 57.24 | 54.96 | 54.59 | 58.10 | 54.23 |
| First ten-day period of June | 52.78 | 51.63 | 50.34 | 48.20 | 51.26 |
| Middle ten days of June | 53.48 | 58.92 | 56.13 | 43.53 | 49.94 |
| Last ten-day period of June | 49.12 | 45.61 | 55.48 | 48.59 | 41.15 |
| First ten-day period of July | 48.11 | 46.14 | 50.29 | 38.75 | 38.58 |
| Middle ten days of July | 44.23 | 47.78 | 40.54 | 47.11 | 36.99 |
| Last ten-day period of July | 48.67 | 44.20 | 48.93 | 44.11 | 36.82 |
| First ten-day period of August | 39.61 | 36.23 | 39.47 | 35.82 | 32.25 |
| Middle ten days of August | 36.06 | 35.84 | 44.88 | 37.94 | 30.87 |
| Last ten-day period of August | 40.51 | 41.77 | 45.38 | 38.44 | 32.95 |
| First ten-day period of September | 31.39 | 32.10 | 36.17 | 32.89 | 27.58 |
| Middle ten days of September | 26.30 | 33.28 | 32.52 | 24.80 | 25.62 |
| Last ten-day period of September | 28.76 | 27.13 | 28.42 | 22.56 | 23.26 |
| First ten-day period of October | 23.65 | 26.21 | 28.53 | 21.86 | 19.47 |
| Middle ten days of October | 20.71 | 22.13 | 21.32 | 22.27 | 16.12 |
| Last ten-day period of October | 17.12 | 20.67 | 20.26 | 16.62 | 14.71 |
| First ten-day period of November | 12.03 | 13.43 | 15.63 | 13.68 | 10.65 |
| Middle ten days of November | 10.47 | 11.28 | 13.46 | 11.79 | 8.76 |
| Last ten-day period of November | 8.69 | 10.85 | 10.77 | 7.69 | 7.38 |
| First ten-day period of December | 6.81 | 8.41 | 9.38 | 7.71 | 6.29 |
| Middle ten days of December | 6.56 | 6.18 | 7.53 | 8.38 | 5.76 |
| Last ten-day period of December | 6.85 | 7.10 | 8.97 | 9.21 | 5.90 |

The crop coefficient is obtained by combining the data of crop growth tests in Hebei Province and Cangzhou City. The growth stage of winter wheat in Xinhua District starts from late September to mid-June of the next year, and the growth stage of summer corn starts from mid-to-late June to mid-to-late September. Table 3 shows the crop coefficients of winter wheat and summer corn throughout the growth stage. The water usage for all ten-day periods during the growth stage are accumulated as the irrigation water quota of winter wheat and summer corn, as shown in Table 4.

TABLE 3

Main crop coefficients (Kc) in the baseline period

| Crop | Duration/$K_c$ | Initial growth stage | Freeze-thaw stage | Overwintering stage | Rapid growth stage | Middle growth stage | Mature stage |
|---|---|---|---|---|---|---|---|
| Winter wheat | Duration | September 27-November 27 | November 28-December 5 | December 6-March 18 | March 19-April 27 | April 28-May 30 | May 31-June 15 |
| | $K_c$ | 0.6 | 0.6-0.4 | 0.4 | 0.4-1.17 | 1.17 | 1.17-0.4 |

TABLE 3-continued

Main crop coefficients (Kc) in the baseline period

| Crop | Duration/$K_c$ | Initial growth stage | Freeze-thaw stage | Overwintering stage | Rapid growth stage | Middle growth stage | Mature stage |
|---|---|---|---|---|---|---|---|
| Summer corn | Duration | June 18-July 4 | | | July 5-August 1 | August 2-September 2 | September 3-September 26 |
| | $K_c$ | 0.55 | | | 0.55-1.14 | 1.14 | 1.14-0.59 |

TABLE 4

Annual irrigation water requirement quotas and average irrigation water requirements of typical crops in the baseline period

| Year | $ET_0$ | Winter wheat water requirement (mm) | Winter wheat effective rainfall Pe (mm) | Winter wheat irrigation water requirement quota (mm) | Summer corn water requirement (mm) | Summer corn effective rainfall Pe (mm) | Summer corn irrigation water requirement quota (mm) |
|---|---|---|---|---|---|---|---|
| 2010 | 1010.4 | 426.6 | 97.3 | 329.26 | 341.6 | 230.8 | 110.8 |
| 2011 | 1001.0 | 382.8 | 155.0 | 227.83 | 303.2 | 224.6 | 78.6 |
| 2012 | 1076.0 | 405.7 | 127.3 | 278.41 | 298.3 | 255.8 | 42.5 |
| 2013 | 956.7 | 322.8 | 110.4 | 212.38 | 286.6 | 159.1 | 127.8 |
| 2014 | 900.3 | 283.5 | 181.9 | 101.61 | 237.8 | 169.6 | 68.3 |
| Average | 988.9 | 364.3 | 134.4 | 229.9 | 293.6 | 208.0 | 85.6 |

Determination of Effective Rainfall During the Growth Stage of Typical Crops

Based on the ten-day rainfall of the weather station in the selected area, the ten-day areal rainfall is calculated by the Thiessen polygon method, and the effective rainfall during the growth stage of the typical crop is calculated in combination with the ten-day water requirement of the typical crop. The irrigation water quotas of the typical crops in the baseline period are determined to be: 230 mm for winter wheat and 85.6 mm for summer corn.

According to step S4 of the present invention, the average irrigation water usage per unit area of winter wheat in the baseline period is calculated to be 229.9 mm (2299.5 m³/ha); the average irrigation water usage per unit area of summer corn in the baseline period is calculated to be 85.6 mm (856.5 m³/ha).

In practice, according to the measurement and reporting of water issued by the government from 2010 to 2014, it is necessary to reduce the planting area of winter wheat, while implementing water-saving planning projects in the area, namely implementing structural adjustment and water-saving technical measures for the integration of water and fertilizer in winter wheat and summer corn. In this way, the average actual irrigation water usage per unit area of the test area measured in the consecutive years of 2010-2014 is only 2346 m³/ha for summer wheat and 831 m³/ha for summer corn.

A comparison between the irrigation water requirement per unit area of the typical crops in the baseline period and the measured irrigation water requirement per unit area of the typical crops indicates that the measured irrigation water requirement per unit area of summer corn is less than the theoretical value in the baseline period and thus the theoretical value in the baseline period needs to be corrected. In this regard, the irrigation water requirement per unit area of summer wheat and summer corn is corrected by means of step S6. The corrected water requirement per unit area of winter wheat is 2083.5 m³/ha, which is 9.3% less than the theoretical water usage per unit area. The water requirement per unit area of summer corn is 801 m³/ha, which is 6.5% less than the theoretical water usage per unit area. Table 5 shows a comparison among the calculated indicators before and after the correction.

TABLE 5

Changes in water requirement per unit area of typical crops before and after the correction based on measured values

| Indicator | | Winter wheat | Summer corn |
|---|---|---|---|
| Reference year average (m³/ha) | | 2299.5 | 856.5 |
| Measured value in 2015 (m³/ha) | | 2220 | 831 |
| Correction to reference value based on measured value (m³/ha) | | 2085 | 801 |
| Compared with the reference year average | Change | 14.3 | 3.7 |
| | Percent change (%) | 9.3 | 6.5 |

In summary, the irrigation water requirement per unit area obtained by the forecasting method, according to this technical solution, is relatively close to the actual measured value, and thus can be used to accurately forecast the irrigation water requirement per unit area for the next year, thereby ensuring the accuracy of forecasting the total water requirement for the next year.

What is claimed is:

1. A method of forecasting an agricultural irrigation water requirement, comprising:

S1: obtaining agricultural statistics of a water-saving area, and selecting crops each with a sown area larger than a set proportion as typical crops based on the agricultural statistics;

S2: obtaining ten-day meteorological information in the water-saving area in a baseline period from weather stations in the water-saving area, and calculating an irrigation water quota of the typical crops during a growth stage in the baseline period according to the meteorological information;

S3: obtaining ten-day rainfall in the water-saving area from the weather stations in the water-saving area, and calculating effective rainfall of the typical crops in the baseline period based on the ten-day rainfall;

S4: calculating an irrigation water requirement per unit area of the typical crops based on the baseline period, the irrigation water quota and the effective rainfall of the typical crops;

S5: determining whether the irrigation water requirement per unit area of at least one typical crop of the typical crops is greater than an average of actual irrigation water usage per unit area measured in consecutive years, if the irrigation water requirement per unit area of the at least one typical crop is greater than the average of the actual irrigation water usage per unit area measured in the consecutive years, proceed to step S6, and if the irrigation water requirement per unit area of the at least one typical crop is less than or equal to the average of the actual irrigation water usage per unit area measured in the consecutive years, proceed to step S7;

S6: correcting the irrigation water requirement per unit area of the typical crops based on the irrigation water requirement per unit area of the typical crops in the baseline period and the actual irrigation water usage per unit area measured in the consecutive years by the following equation:

$$q_i = \frac{\sum_{j=1}^{m} q_{ij} + \sum_{g=1}^{k'} q_{i,g}}{m},$$

$(i = 1, 2, 3, \ldots n, j = 1, \ldots, m, g = 1, \ldots, k');$ wherein, $q_i$ denotes the irrigation water requirement per unit area of a typical crop i; $q_{ij}$ denotes the irrigation water requirement per unit area of the typical crop i in a $j^{th}$ year; m denotes the baseline period counted in years; $q_{i,g}$ denotes the actual irrigation water usage of the typical crop i in a $g^{th}$ year; n denotes a total number of the typical crops; and k' denotes the consecutive year; and S7: calculating a total water requirement for a next year by using the irrigation water requirement per unit area of the typical crops and a planting area of each typical crop of the typical crops for the next year, wherein the method further comprising:

correcting the total water requirement for the next year, wherein planned water usage for the next year is obtained, and the planned water usage is compared with the total water requirement;

when the total water requirement is larger than the planned water usage for the next year, adjusting the planting area of the typical crop according to an adjustment strategy, and returning to step S7; and when the total water requirement is less than or equal to the planned water usage for the next year, outputting the total water requirement for the next year and current planting areas of the typical crops.

2. The method according to claim 1, wherein, the adjustment strategy comprises:

reducing the planting area of a typical crop with a smallest economic value according to a set threshold; or reducing the planting area of a typical crop with a largest irrigation water requirement according to the set threshold; or reducing the planting area of the typical crops according to a preset proportion; wherein the set threshold is greater than the preset proportion.

3. The method according to claim 1, wherein, step S2 further comprises:

S21: according to the meteorological information, calculating ten-day potential evapotranspiration of the each typical crop in the baseline period by using a Penman Monteith (PM) equation expressed as follows:

$$ET_0 = \frac{0.408\Delta(R_n - G) + \gamma \frac{900}{T+273} U_2(e_a - e_d)}{\Delta + \gamma(1 + 0.34U_2)};$$

wherein, $ET_0$ denotes the ten-day potential evapotranspiration of the each typical crop in the baseline period; $\Delta$ denotes a slope of a saturation vapor pressure-temperature curve; $R_n$ denotes net radiation at a canopy of the each typical crop; G denotes a soil heat flux; $\gamma$ denotes a psychrometric constant; T denotes a mean temperature; $U_2$ denotes a wind speed at a 2-meter height; $e_a$ denotes a saturation vapor pressure; $e_d$ denotes an actual vapor pressure;

S22: calculating a ten-day water requirement of the typical crops based on the ten-day potential evapotranspiration and a ten-day crop coefficient of the typical crops during the growth stage by the following equation:

$$ET_{i,j,k} = ET_{0j} \times Kc_{i,k};$$

wherein, $ET_{i,j,k}$ denotes the ten-day water requirement of the typical crop i in a $k^{th}$ ten-day period of the growth stage in a $j^{th}$ year; $Kc_{i,k}$ denotes the ten-day crop coefficient of the typical crop i in the $k^{th}$ ten-day period of the growth stage; and S23: accumulating all ten-day water requirements during the growth stage to obtain the irrigation water quota $ET_{i,j}$ of the typical crops by the following equation:

$$ET_{i,j} = \sum_{k=1}^{n} ET_{0j} \times Kc_{i,k};$$

wherein, N denotes a total number of the ten-day periods of the growth stage of the typical crops in the baseline period.

4. The method according to claim 3, wherein, the effective rainfall in a sown region of the typical crops in the baseline period is calculated based on the ten-day rainfall by the following steps:

S31: according to the ten-day rainfall, calculating ten-day areal rainfall of the typical crops in the baseline period by a spatial interpolation method;

S32: obtaining the ten-day rainfall $PE_{i,j,k}$ according to the ten-day areal rainfall and the ten-day water requirement of the typical crops in the ten-day period by the following equation:

$$PE_{i,j,k} = \min(P_{i,j,k}, ET_{i,j,k});$$

wherein, $P_{i,k,j}$ denotes the ten-day areal rainfall of the typical crop i in the $k^{th}$ ten-day period of the growth stage in the $j^{th}$ year; and S33: accumulating all ten-day rainfall during the growth stage to obtain the effective rainfall $PE_{i,j}$ in the planting area of the typical crops by the following equation:

$$PE_{i,j} = \sum_{k=1}^{n} \min(P_{i,j,k}, ET_{i,j,k}),$$

$(i = 1, 2, 3, \ldots n; j = 1, 2, 3, \ldots m; k = 1, 2, 3\ldots).$

5. The method according to claim 4, wherein,
a method for calculating the irrigation water requirement $q_i$ per unit area of the typical crop i comprises:
S41: calculating the irrigation water requirement $IR_{i,j}$ per unit area of the typical crop i in the $j^{th}$ year by the following equation:

$IR_{i,j} = ET_{i,j} - PE_{i,j}, (i=1,2,3,\ldots n, j=1,2,3,\ldots m);$ and

S42: according to the irrigation water requirement $IR_{i,j}$, calculating the irrigation water requirement $q_i$ per unit area of the typical crop i by the following equation:

$$q_i = \sum_{j=1}^{m} q_{ij} = \sum_{j=1}^{m} IR_{i,j}/m, (i = 1, 2, 3, \ldots n, j = 1, 2, 3, \ldots m).$$

6. The method according to claim 4, wherein,
the spatial interpolation method for calculating the ten-day areal rainfall of the typical crops in the baseline period comprises:
when a terrain elevation of the water-saving area and a distance from a point used in the weather station to a calculation area center position are smaller than a set value, calculating the ten-day rainfall of the typical crops in the baseline period by a Thiessen polygon method; and
when the terrain elevation of the water-saving area and the distance from the point used in the weather station to the calculation area center position are greater than or equal to the set value, calculating the ten-day areal rainfall of the typical crops in the baseline period by an inverse distance weighting method.

7. The method according to claim 1, wherein, step S7 further comprises:
S71: calculating a theoretical water requirement of the each typical crop for the next year by using the irrigation water requirement per unit area of the each typical crop and the planting area of the each typical crop for the next year by the following equation:

$Q_i = q_i \times A_i, (i=1,2,3,\ldots n);$ wherein, $Q_i$ denotes the theoretical water requirement of the typical crop i for the next year; $A_i$ denotes the planting area of the typical crop i for the next year; and
S72: accumulating the theoretical water requirements of the typical crops to obtain the total water requirement Q for the next year by the following equation:

$$Q = \sum_{i=1}^{n} Q_i, (i = 1, 2, 3, \ldots n).$$

* * * * *